United States Patent [19]

Kunert et al.

[11] Patent Number: 4,981,308
[45] Date of Patent: Jan. 1, 1991

[54] REAR AXLE SUSPENSION FOR A MOTOR VEHICLE

[75] Inventors: Reinhard Kunert, Weissach-Flacht; Francesco Germano, Bietigheim-Bissingen; Wilhelm Kroniger, Friolzheim, all of Fed. Rep. of Germany

[73] Assignee: Dr. Ing. h.c.F. Porsche Aktiengesellschaft, Fed. Rep. of Germany

[21] Appl. No.: 276,804

[22] Filed: Nov. 28, 1988

[30] Foreign Application Priority Data

Nov. 27, 1987 [DE] Fed. Rep. of Germany ....... 3740310

[51] Int. Cl.$^5$ .......................... B60G 3/04; B60G 7/02
[52] U.S. Cl. .................... 280/661; 280/674; 280/690; 267/293; 403/228
[58] Field of Search ............... 280/661, 673, 701, 690, 280/699; 267/140.1 C, 141.2, 269, 270, 293, 292; 384/221, 222, 296, 275, 427, 153; 403/228, 225

[56] References Cited

U.S. PATENT DOCUMENTS 4,744,677  5/1988  Tanaka et al. .............. 267/292

FOREIGN PATENT DOCUMENTS

| 2036233 | 1/1972 | Fed. Rep. of Germany | 280/723 |
| 2543189 | 4/1977 | Fed. Rep. of Germany | 280/690 |
| 2645272 | 4/1978 | Fed. Rep. of Germany | 280/690 |
| 3242930 | 5/1984 | Fed. Rep. of Germany | |
| 191618 | 11/1983 | Japan | 280/701 |
| 243539 | 10/1988 | Japan | 267/293 |

Primary Examiner—Charles A. Marmor
Assistant Examiner—Karin Tyson
Attorney, Agent, or Firm—Evenson, Wands, Edwards, Lenahan & McKeown

[57] ABSTRACT

A rear axle suspension for a motor vehicle with a wheel guide member retained directly at the wheel carrier which includes a first wheel-outer guide arm and a second wheel-inner guide arm. Both guide arms are pivotally connected at the vehicle body by way of elastic joints, whereby one joint of the first guide arm is constructed yielding longitudinally and together with the further elastic joint of the second guide arm forms an approximately transversely extending guide rotary axis and an imaginary wheel guide pole to the rear of the axis of rotation of the wheel and outside of the track width. The wheel guide member includes a spring strut connected with the guide body by way of a wheel-adjusting device which is constructed as part of a wheel inner guide member and is positioned obliquely to the vehicle longitudinal center axis. The spring strut has as part of the wheel inner guide member a smaller length than an adjoining rigid guide member part of the guide member. The spring strut is constructed to be elastically deflectable and retains the wheel-outer guide arm constructed in one piece with the guide body displaceable within limits by way of the control bearing support on the body side.

11 Claims, 4 Drawing Sheets

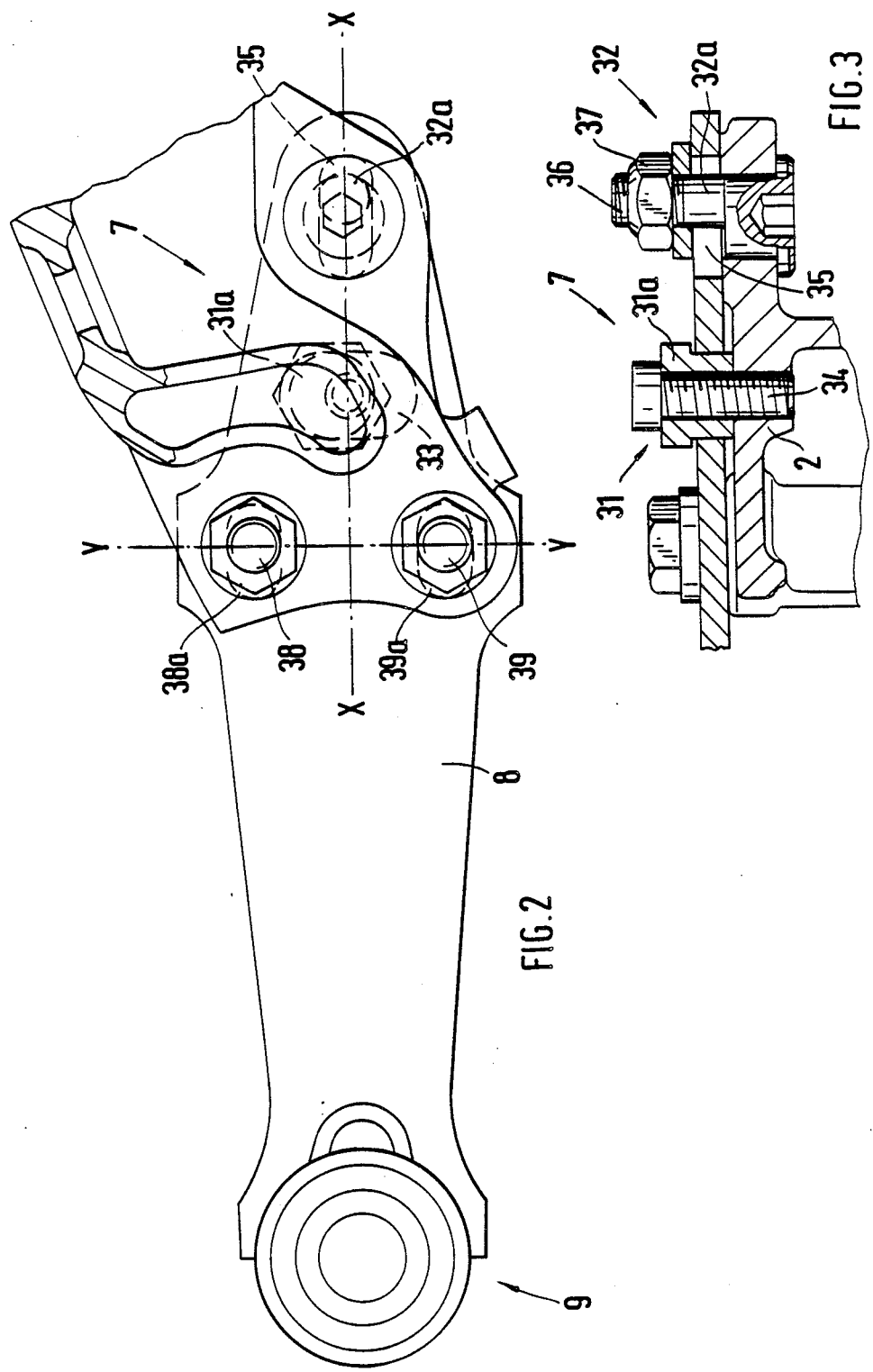

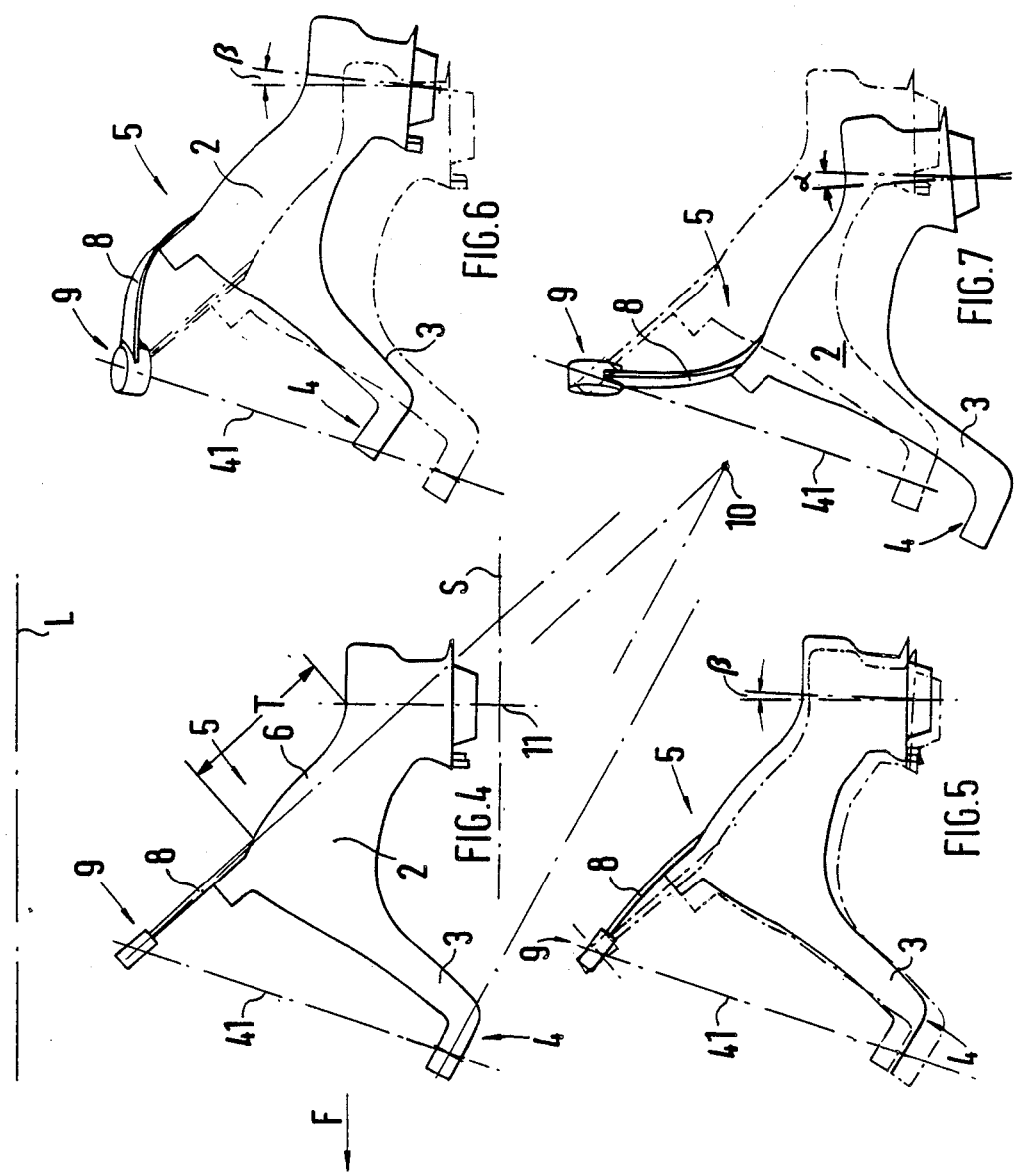

REAR AXLE SUSPENSION FOR A MOTOR VEHICLE

BACKGROUND AND SUMMARY OF THE INVENTION

The present invention relates to a rear axle suspension for a motor vehicle with a wheel guide member directly retained at the wheel carrier that includes a first wheel-outer guide arm and a second wheel-inner guide arm and in which both guide arms are pivotally connected at the vehicle body by way of elastic joints, whereby one joint of the first guide arm is constructed yielding longitudinally and forms together with the further elastic joint of the second guide arm an approximately transversely extending wheel guide axis of rotation and an imaginary wheel guide pole to the rear of the axis of rotation of the wheel and outside of wheel track.

A rear axle suspension with a guide body directly connected with a wheel carrier is disclosed in the DE-OS 32 42 930 which includes a wheel-inner and a wheel-outer guide arm. The wheel-outer guide arm is retained on the body side in an axially movable bearing support whereby the wheel-inner guide arm is supported in a joint. This guide arm consists of a connecting member elastically retained at the guide body and having a vertical axis of rotation so that with forces acting on the wheel an elastic kinematic wheel position change can take place. A wheel suspension having the same manner of operation has become known from the DE-PS 26 45 272 whose wheel-outer guide arm includes a control link or rocker and whose wheel-inner guide arm consists of a bending-elastic spring leaf arranged in the transverse direction.

It is the object of the present invention to provide an improved rear axle suspension for a motor vehicle, by means of which an adjustment of the wheel toe-in and of the wheel camber is possible in a simple manner and in which the wheel under the interaction of forces is adjustable elastokinematically in the direction of toe-in and toe-out when driving straight and when driving through curves.

The underlying problems are solved according to the present invention in that the wheel guide member includes a spring strut connected with a guide body by way of a wheel-adjusting device, whereby the spring strut is constructed as part of a wheel-inner guide member and is positioned obliquely to the vehicle longitudinal center axis, whereby the spring strut as part of the wheel-inner guide member has a lesser length than an adjoining rigid guide part of the guide member and is constructed elastically deflectable, and whereby the spring strut retains the wheel-outer guide arm which is constructed in one piece with the guide body, so as to be displaceable within limits by way of the control bearing support on the body side.

The advantages essentially achieved with the present invention reside in that a wheel suspension is created which adjusts the vehicle wheel under the interaction of forces in a track-correcting manner. Thus, in the cooperation of the control bearing support on the body side of the wheel-outer rigid guide arm with the wheel-inner guide arm constructed as spring strut, a defined toe-out and toe-in adjustment of the wheel is possible in case of curve- and straight drives which is controllable by the joints on the body side forming an imaginary wheel guide pole.

The wheel-inner guide member includes a spring strut retained at its end at the vehicle body in a joint whereby the spring strut is connected with a rigid guide arm that is constructed in one piece with the guide body, by way of a wheel-adjusting device. The spring strut is constructed relatively short and has such a shape that over the entire length of the spring strut, a rigidity is coordinated corresponding to the loads and stresses which occur over this length, whereby this dimensioning takes place from the point of view of the maximum elasticity.

An elastic wheel adjustment with a limitation during the drive takes place by way of a body-side control bearing support at the wheel-outer guide arm which is provided with axial abutments and intentionally and deliberately limits the wheel toe-in and the wheel toe-out angle. In order that the adjustment of the wheel can take place only in the axial direction of the bearing support, it has a softer characteristic in the axial direction than in the radial direction.

The joint of the wheel-inner guide member is preferably constructed as ball joint which includes an elastic layer between an outer bearing shell and the ball. This joint forms essentially a rotary pole for the spring strut of the wheel guide member.

The wheel-adjusting device is arranged between the elastic spring strut and the adjoining rigid part of the guide member, which serves at the same time for the fastening of the spring strut at the adjoining rigid guide arm. This device includes eccentric elements to be adjusted from the inner side for toe-in and camber adjustment. The eccentric element for the camber adjustment together with further bolts serves at the same time for the fastening of the spring strut at the guide body.

In a wheel suspension with a guide arm arranged obliquely to the vehicle longitudinal center axis, it is for the most part difficult in constricted space conditions to so arrange a guide arm of larger dimension, for example, made as a cast part or the like, that no other body groups such as the seat trough, etc. are impaired. As a result of the relatively narrow spring strut arranged edge-wise, only a small amount of space is required within the area of this guide part so that the body groups do not experience any significant constriction.

BRIEF DESCRIPTION OF THE DRAWINGS

These and other objects, features and advantages of the present invention will become more apparent from the following description when taken in connection with the accompanying drawing which shows, for purposes of illustration only, one embodiment in accordance with the present invention, and wherein:

FIG. 2 is a side elevational view of a spring strut with wheel-adjusting device in accordance with the present invention;

FIG. 3 is a plan view, partly in cross section, on a wheel-adjusting device in accordance with the present invention;

FIG. 4 is a schematic illustration in principle of the wheel suspension in accordance with the present invention in case of a straight drive;

FIG. 5 is a schematic illustration in principle of the wheel suspension in case of a straight drive and during a braking condition;

FIG. 6 is a schematic illustration in principle of the wheel suspension when driving through a curve;

FIG. 7 is a schematic illustration in principle of the wheel suspension in case of a straight drive and in the accelerating condition.

DETAILED DESCRIPTION OF THE DRAWINGS

Figure 1:
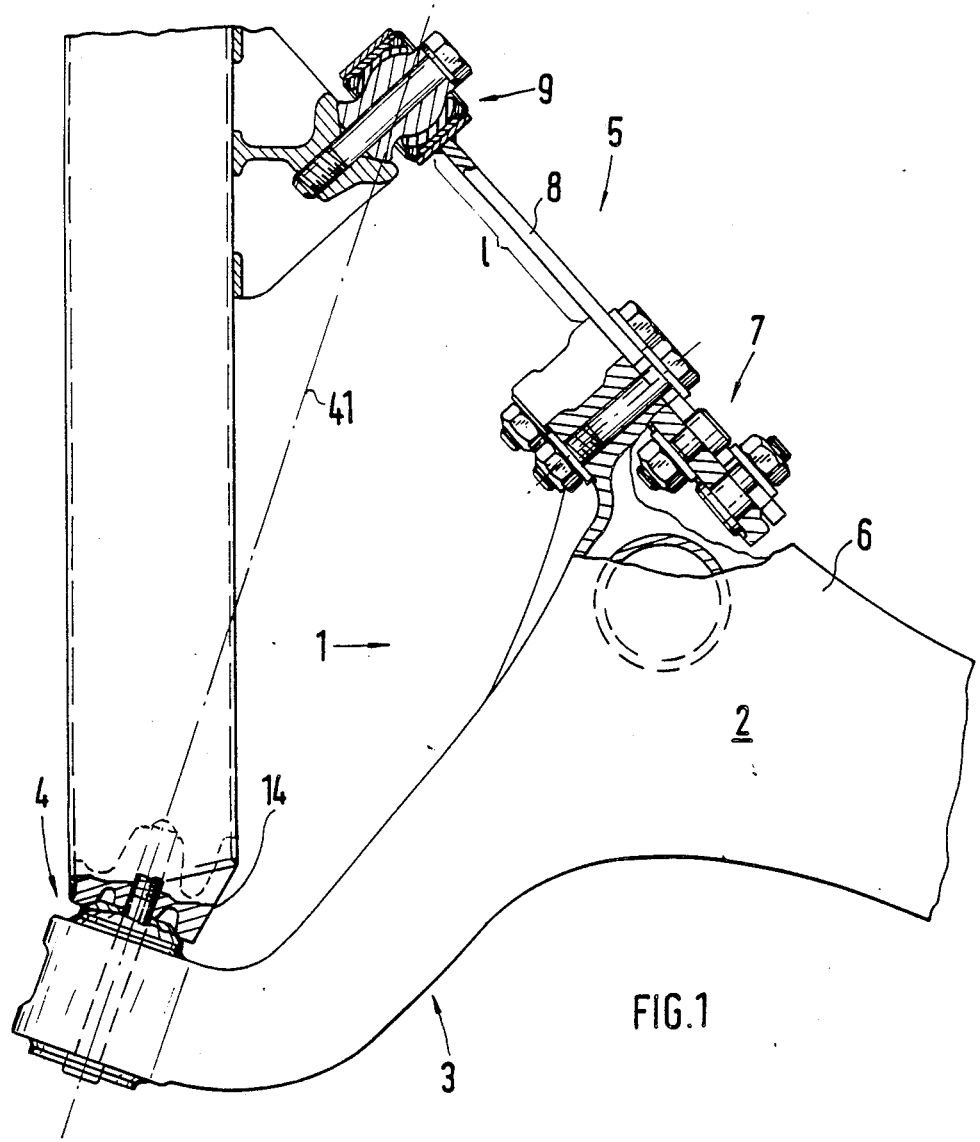
FIG. 1 is a plan view on the rear axle suspension in accordance with the present invention.

Referring now to the drawing wherein like reference numerals are used throughout the various views to designate like parts, the wheel guide member generally designated by reference numeral 1 according to FIG. 1 includes a guide body 2, with which a wheel-outer first guide arm 3 is constructed in one piece and which is pivotally connected on the body side by way of a joint, such as, for example, a control bearing support 4. A wheel-inner second guide arm 5 includes a rigid guide part 6 in one piece with the guide body 2, with which a further guide part constructed as elastic spring strut 8 is connected by way of an adjusting device 7, whereby the further guide part 8 is supported at its end on the body side by way of a joint 9 which can be constructed as ball joint.

The spring strut 8 is arranged edge-wise and is deflectable elastically in the transverse direction and is arranged diverging to the wheel-outer guide arm 3, whereby it has a smaller length 1 than on length 1 of the adjoining guide part 6 of the guide arm 5 as seen in FIG. 4. The spring strut 8 is constructed conically tapering between the adjusting device 7 and the body side joint 9 in such a manner that the same rigidity with a maximum elasticity exists over the entire length.

The wheel suspension is designed in such a manner that an imaginary wheel guide pole 10 (FIG. 4) results from the position of the control bearing support 4 together with the guide member 3 and by the position of the joint 9 with the spring strut 8, which pole 10—as viewed in the driving direction F—is located to the rear of the axis of rotation 11 of the wheel and outside of the track width S. As a result thereof, an elastokinematic wheel position change in the direction of toe-in and toe-out is achieved with forces such as brake-, acceleration- and lateral forces, acting on the wheel.

Figure 8:
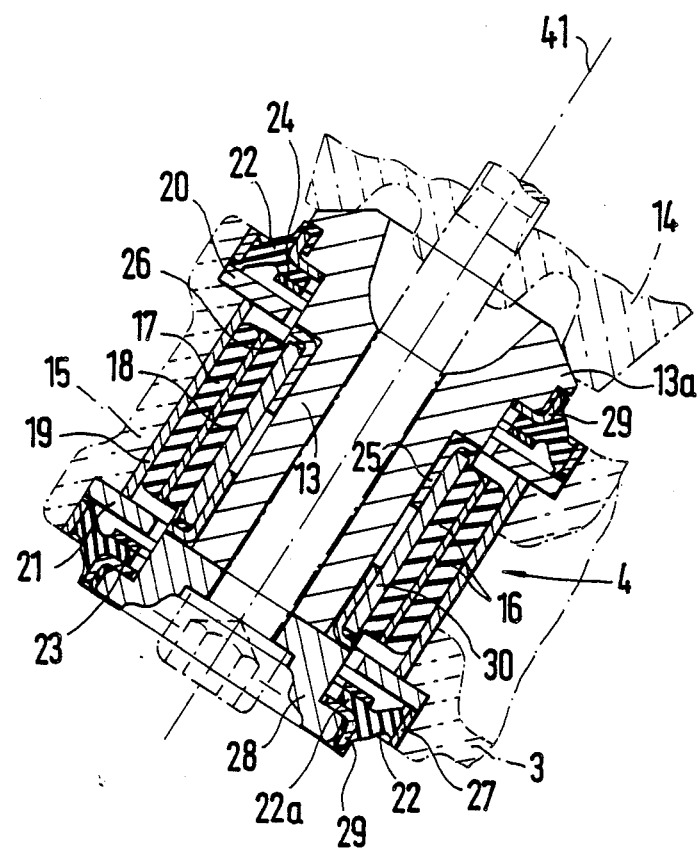
FIG. 8 is a cross-sectional view of one embodiment of a control bearing support in accordance with the present invention of the wheel outer guide arm on the body side.

The control bearing support 4 (FIG. 8) serves essentially for the limitation of the wheel adjustment in case of forces acting on the wheel and is retained on a cross bearer 14 of the vehicle body by means of a flange bushing 13. The bearing element 16, properly speaking, is arranged between this bushing 13 and the bearing eye 15, respectively, between an outer shell 19; the bearing element 16 consists of a double-layer rubber bushing 17, 18. For limiting axial movements, the control bearing support 4 includes abutment disks 20 and 21 which are retained in the bearing eye 15 inside of the bearing element. They are provided with elastic slide disks 23 and 24 arranged end-face and connected with sealing and abutment elements 22 disposed opposite one another. These slide disks 23 and 24 enable together with a slide bushing 25, respectively, with two axially identically arranged slide bushings between the bushing 13 and the rubber bushings 17, 18 an optimum twistability of the wheel guide member 1 during spring deflection occurrences, even if the abutment disk 20 or 21 is in abutment with respect to the slide disk 23 or 24. The slide disks 23 and 24 also serve the purpose to protect the abutment buffers 22a of the sealing and abutment elements 22 against wear.

A softer twistability and axial rigidity is achieved compared to the radial stiffness by the double-layered rubber bushing 17, 18 of the slide bearing 4 with an intermediate shell 26.

The elastic sealing and abutment element 22 is clamped-in between an outer ring 27 and a fastening flange 28 supported at the flange bushing 13. A support ring 29 is arranged in the sealing element 22 which, on the one hand, is axially supported at the fastening flange 28 and at the bushing 13 and, on the other, retains the sealing element 22 radially elastically on the fastening flange 28. The elastic element 22 is pressed into the bearing eye 15 and on the flange bushing 13 in such a manner that it can be stressed in torque in case of wheel inward spring movements and axially elastically in case of forces on the wheel. For avoiding overloads by torsional stresses the element 22 is rotatable together with the support ring—which is provided with rubber on its inner surface—with respect to the fastening flange 28 and the flange 13a of the bushing 13. An inner tubular member 30 can be arranged between the slide bushings 25 and the rubber bushings 17 and 18. According to a further embodiment which is not illustrated, this inner tubular member may also be constructed at the same time as slide bushing.

The possible wheel adjustments in case of straight drive and curve drive during the driving conditions, braking, acceleration and in case of a lateral force are illustrated in principle in FIGS. 4 to 7.

FIG. 4 illustrates a wheel guide member 1 with a left rear wheel in its initial position. In FIG. 5, the same wheel guide member is illustrated in full lines during a braking operation. The wheel guide member 1 is displaced by way of the control bearing support 4 on the bearing axis 41 of the bearing support 4 whereby at the same the spring strut 8 deflects elastically and the vehicle wheel assumes a toe-in position with the angle $\beta$.

In FIG. 6 the wheel guide member 1 is shown in full line during a curve drive under the influence of lateral forces. The curve-outer vehicle wheel adjusts itself as shown in the direction of toe-in under the angle $\beta$.

In FIG. 7 the wheel guide member 1 is illustrated during an acceleration operation in which the wheel adjusts itself in the direction of toe-out under the angle $\alpha$.

During all driving operations according to FIGS. 5 to 7, the spring strut 8 is deflected elastically within limits of the displaceability of the control bearing support 4 so that by a corresponding dimensioning the adjustment of the wheel guide member 1 and of the vehicle wheel within the control bearing support 4 and by the elasticity of the spring strut, a desired toe-in and toe-out adjustment of the vehicle wheel is attainable in the different driving conditions.

The wheel-adjusting device 7 of the wheel guide member includes eccentric elements 31 and 32 (FIG. 3) arranged in a horizontal plane X-X. The one eccentric element 32 serves for the adjustment of the wheel camber and the further eccentric element 31 serves for the adjustment of the toe-in.

The eccentric element 31 is arranged by means of an eccentric sleeve 31a in a vertical elongated aperture 33 and is connected with the guide body 2 by way of a bolt 34. The further eccentric element 32 includes an eccentric bolt 32a at a screw 36, whereby the eccentric bolt 32a is arranged in a horizontal elongated aperture 35 and is secured with the guide body 2 by means of a nut 37.

The spring strut 8 is detachably connected with the guide body 2 by way of fastening bolts 38 and 39 arranged in a vertical plane Y-Y which are retained in elongated apertures 38a and 39a of the spring strut, as well as by way of the bolt 36 of the eccentric element 32.

While we have shown and described only one embodiment in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. A rear axle suspension for a motor vehicle for elastokinematic adjustment of wheel toe-in and wheel chamber of a vehicle wheel by driving forces exerted on the wheel when the vehicle is driving straight and when driving through a curve, comprising wheel carrier means, wheel guide means directly retained at the wheel carrier means, the wheel guide means effectively providing a first wheel-outer guide arm and a second wheel inner guide arm, both guide arms being pivotally connected at a relatively fixed vehicle part by way of first and second elastic joint means, respectively, the first joint means of the first guide arm being constructed longitudinally yielding and forming together with the second elastic joint means of the second guide arm an approximately transversely extending axis of rotation for the guide means, the wheel guide means including guide body means, a spring strut means connected with the guide body means by way of a wheel-adjusting means and forming part of the wheel-inner guide arm, the spring strut means being positioned obliquely to a vehicle longitudinal center axis and as part of the wheel-inner guide arm having a smaller length than an adjoining rigid guide part of the wheel-inner guide arm, the spring strut means being constructed so as to be elastically deflectable and retaining the wheel-outer guide arm to be displaceable within limits at a relatively fixed part by way of a control bearing support means forming the first joint means, whereby an imaginary wheel guide pole, located at an intersection of an axis extending perpendicular to the axis of the control bearing support means and through a portion of the first guide arm with an axis extending through the second elastic joint means and the spring strut means, located behind an axis of rotation of the wheel.

2. A rear axle suspension according to claim 1, wherein the spring strut means includes a carrier conically tapering toward the second joint means on the body side and having substantially the same rigidity over the entire length.

3. A rear axle suspension according to claim 2, wherein the spring strut means is connected with the guide body means displaceable with respect to the rigid guide part by way of fastening bolts arranged in elongated apertures, and wherein eccentric members of the wheel-adjusting means are retained in the relatively rigid guide part whose one eccentric member is guided in a vertical elongated aperture for toe-in adjustment and whose other eccentric member is guided in a horizontal elongated aperture for camber adjustment.

4. A rear axle suspension according to claim 3, wherein the eccentric members are arranged at a free end of the spring strut means adjacent one another in a substantially horizontal plane, and wherein the one eccentric member together with the fastening bolts supported adjacent in a vertical plane are constructed as clamping elements.

5. A rear axle suspension according to claim 1, wherein the spring strut is connected with the guide body means displaceable with respect to the rigid guide part by way of fastening bolts arranged in elongated apertures, and wherein eccentric members of the wheel-adjusting means are retained in the relatively rigid guide part whose one eccentric member is guided in a vertical elongated aperture for the toe-in adjustment and whose other eccentric member is guided in a horizontal elongated aperture for the camber adjustment.

6. A rear axle suspension according to claim 5, wherein the eccentric members are arranged at the free end of the spring strut means adjacent one another in a substantially horizontal plane, and wherein the one eccentric member together with the fastening bolts supported adjacent in a vertical plane are constructed as clamping elements.

7. A rear axle suspension according to claim 6, wherein the control bearing support means includes a slide bushing means between a flange bushing and double-layered rubber bushings.

8. A rear axle suspension according to claim 7, wherein the bearing means includes a sleeve between the slide bushing means and the double-layered rubber bushings.

9. A rear axle suspension for a motor vehicle with a wheel guide means retained at a wheel carrier means of a vehicle wheel, comprising:
wheel-inner and wheel-outer guide arms which are pivotally connected at a relatively fixed vehicle part;
a bearing means, of an elastic joint means, which is constructed as slide and pivot bearing means, for pivotally connecting the wheel-outer guide arm on the body side having a torsional and axial rigidity softer compared to the radial rigidity thereof; and
a transversely elastic spring strut means which forms part of the wheel-inner guide arm, the bearing means and transversely elastic spring strut means permitting the vehicle wheel to toe-in and toe-out;
wherein the bearing means is arranged on a flange bushing retained at a relatively fixed vehicle part and is connected with the wheel-outer guide arm by an outer shell pressed into a bearing eye, and double-layer rubber bushings elastically movable in the axial direction provided between the flange bushing and the shell; and
wherein the bearing means includes:
abutment disks for limiting elastic axial movements in a direction of toe-in and toe-out which are retained in the bearing eye inside of the bearing means,
an end-face slide disk seated opposite each abutment disk,
a fastening flange,
an outer ring, and
sealing and abutment elements clamped between the fastening flange and the outer ring, the abutment disks being elastically retained at the sealing and abutment elements.

10. A rear axle suspension according to claim 9, wherein the bearing means further includes a slide bushing means between the flange bushing and the double-layered rubber bushings.

11. A rear axle suspension according to claim 10, wherein the bearing means includes a sleeve between the slide bushing means and the double-layered rubber bushings.

* * * * *